(12) United States Patent
Kang et al.

(10) Patent No.: US 7,340,355 B2
(45) Date of Patent: Mar. 4, 2008

(54) COMPENSATED CURRENT DIFFERENTIAL RELAYING METHOD AND SYSTEM FOR PROTECTING TRANSFORMER

(75) Inventors: Yong-Cheol Kang, Chonbuk (KR); Sang-Hee Kang, Seoul (KR)

(73) Assignee: Yong-Gyun Kim, Seoul (KR)

( * ) Notice: Subject to any disclaimer, the term of this patent is extended or adjusted under 35 U.S.C. 154(b) by 256 days.

(21) Appl. No.: 11/476,891

(22) Filed: May 9, 2005

(65) Prior Publication Data
US 2007/0007943 A1    Jan. 11, 2007

(30) Foreign Application Priority Data
May 10, 2004    (KR)    .................. 10-2004-0032762

(51) Int. Cl.
*G01R 31/00*    (2006.01)
(52) U.S. Cl. .......................... 702/58; 361/36
(58) Field of Classification Search .................. 702/57, 702/64–65, 104, 106–107, 124, 126; 324/546–547, 324/605–606; 323/356–357
See application file for complete search history.

(56) References Cited

U.S. PATENT DOCUMENTS

| | | | | |
|---|---|---|---|---|
| 3,863,109 A * | 1/1975 | Emanuel et al. | ............... | 361/35 |
| 5,066,904 A * | 11/1991 | Bullock | ....................... | 324/127 |
| 5,150,270 A * | 9/1992 | Ernst et al. | ................... | 361/64 |
| 5,559,419 A * | 9/1996 | Jansen et al. | ............... | 318/808 |
| 6,020,732 A * | 2/2000 | Wood | ......................... | 323/356 |
| 6,384,588 B1 * | 5/2002 | Mulhauser | .................. | 323/356 |
| 6,590,380 B2 * | 7/2003 | Edel | ........................... | 324/127 |
| 2004/0204875 A1 * | 10/2004 | Kopken | ....................... | 702/64 |

\* cited by examiner

*Primary Examiner*—Hal Wachsman
*Assistant Examiner*—Mary Catherine Baran
(74) *Attorney, Agent, or Firm*—The Webb Law Firm

(57) ABSTRACT

Disclosed is a compensated current differential relaying method and system for protecting a transformer more correctly by calculating and estimating an exciting current including a core-loss current and a magnetizing current, and, in particular, to a compensated current differential relaying method and system which can protect the transformer correctly irrespective of the level of remanent flux.

8 Claims, 8 Drawing Sheets

(PRIOR ART)

COMPENSATED CURRENT DIFFERENTIAL RELAYING METHOD AND SYSTEM FOR PROTECTING TRANSFORMER

BACKGROUND OF THE INVENTION

1. Field of the Invention

The present invention relates to a current-differential relaying method and system for protecting a transformer more correctly by calculating and estimating an exciting current including a core-loss current and a magnetizing current, and, in particular, to a current-differential relaying method and system which can protect the transformer correctly irrespective of the level of remanent flux.

2. Description of the Prior Art

As in the case of a generator or a power transmission line, differential relays have been widely used for protecting a transformer from internal faults. Herein the term 'differential current relay' indicates the method of calculating the difference of currents flowing through both terminals of the transformer (hereinafter, referred to as "differential current"), and detecting an internal fault when its value exceeds a certain predetermined value.

FIG. 1 shows a configuration of a relay system for transformer protection according to a conventional current differential relay. As shown in FIG. 1, the conventional current differential relay system comprises a transformer 40 connecting both terminals 10, 70 in the power system, a primary current measurement unit 30 of the transformer, a secondary current measurement unit 50 of the transformer, a transformer protection controller 80 for driving circuit breakers 20, 60 for protecting the transformer by using a primary current and a secondary current measured at said current measurement units.

However, when the transformer is energized, a large current flows through the primary winding and a large differential current occurs, which is referred to as a "magnetic inrush (or inrush)" and which results in a problem that the differential current occurs even when internal faults are not present. In order to prevent the transformer protection relay from mal-operating, the transformer protection relay must discriminate correctly magnetic inrush or over-excitation from an internal fault.

Generally, because the primary current includes harmonic components, a second harmonic restraining current-differential relaying method is used in order to discriminate an internal fault from magnetic inrush, in which the differential current is an operating current for relay operation and the second harmonic component is a restraining or blocking current. Furthermore, in order to discriminate between an internal fault and over-excitation, a fifth harmonic restraining current-differential relaying method may be used in which the fifth harmonic component is a restraining or blocking current. However, these methods have the limit of application due to the difficulty of accurate discrimination between an internal fault and magnetic inrush, in that the magnitude of each harmonic component may be varied depending on whether or not there is the remanent flux in the iron core or depending on the magnitude of the remanent flux, and in that, when a power condition and a condition such as quality of transformer core material are changed, a large amount of the second harmonic component may be included even in the case of an internal fault. Furthermore, the harmonic components exist in a transient period after an internal fault occurs. Therefore, it needs a substantial amount of time until the harmonic components become zero and thus rapid fault detection is difficult. And, the restraining or blocking methods using these harmonic components may prevent maloperation to some extent in the case of magnetic inrush or over-excitation, but they cannot prevent maloperation in the case that the differential current has a small amount of harmonic components.

To solve this problem, a relaying method was proposed using magnetic flux derived from the primary voltage. This method employed the principle that the magnetizing current and the flux comply with the magnetization curve during magnetic inrush, while the flux is proportional to the magnetizing current and the ratio of the change in the flux to the change in the magnetizing current becomes small during an internal fault. However, there is a problem that, if there is the remanent flux, the errors occur because the locus of the magnetizing current versus flux deviates from the magnitization curve.

Accordingly, a method was proposed using the ratio of the change in the flux to the change in the magnetizing current, i.e. the slope of the magnetization curve. If the slope is large, a counter decreases; if the slope is small, the counter increases. When the counter exceeds a preset value, a trip signal is activated. However, there is a problem that this method cannot apply to the over-excitation and the magnetic inrush on a loaded transformer, because the primary current and the differential current are not equal to each other.

Furthermore, in order to provide a method which can be also applied to the case that there is the remanent flux, a method was proposed using the region bounded with the lower and upper limits rather than the magnetization curve. The former is the flux on the curve minus the maximum remanent flux and the latter the flux on the curve plus the maximum remanent flux. However, according to this method, as the maximum remanent flux is 80% of the saturation-point flux, the bounded region becomes very wide and thus includes the region for an internal fault and the operating time for an internal fault is inevitably delayed.

In order to the shortcomings of these current differential relays, transformer model-based protection methods were proposed. These methods may perform a very rapid calculation without calculating the phasors of voltage and current. However, they have the limit of application in that a large amount of data should be measured because they need the voltages as well as the currents of both terminals of the transformer.

Hereinafter, a conventional compensated-current differential relay suitable for protection of power transformer is described. FIG. 2 shows a three-phase Y-Y transformer 40, and FIG. 3 shows the per phase equivalent circuit of the transformer 40. The nomenclature used in the figures is as follows:

$v_{1A}$, $v_{1B}$, $v_{1C}$, $v_{2A}$, $v_{2B}$ and $v_{2C}$: primary and secondary voltages of each phase;

$i_{1A}$, $i_{1B}$, $i_{1C}$, $i_{2A}$, $i_{2B}$ and $i_{2C}$: primary and secondary currents of each phase;

$v_1$ and $v_2$: primary and secondary voltages;

$e_1$ and $e_2$: primary and secondary induced voltages;

$i_1$ and $i_2$: primary and secondary currents;

$R_1$ and $R_2$: primary and secondary winding resistances;

$L_{11}$ and $L_{12}$ primary and secondary leakage inductances;

$R_c$: core-loss resistance;

$L_m$: magnetizing inductance;

$N_1$ and $N_2$: numbers of primary and secondary windings;

$i_e$: exciting current;

$i_c$: core-loss current; and $i_m$: magnetizing current

A conventional differential relay derives the magnitude of the differential current using:

$$I_d = |I^p_1 - aI^p_2| \quad (1)$$

where, $I^p_1$ and $I^p_2$ are the phasors of the fundamental component of the primary and secondary currents, respectively, and $a=N_2/N_1$. And the magnitude of the fundamental component of the restraining current $I_r$ for restraining or blocking the relay operation is obtained by:

$$I_r = \frac{|I^p_1 + aI^p_2|}{2} \quad (2)$$

And the characteristic of the relay is given by:

$$I_d \geq I_{offset} + KI_r, \; I_{offset} = 15A \quad (3)$$

where K represents the sensitivity of relay and may be set arbitrarily. The below data is based on 0.3 of the sensitivity of the relay. According to this conventional current differential relay, as seen in equation (1), the differential current does not include the exciting current $i_e(t)$. Thus, as $i_e(t)$ becomes significant during magnetic inrush or over-excitation, the differential current, $$I_d = |I^p_1 - aI^p_2|,$$

may exceed the restraining threshold and the conventional relay will mal-operate.

SUMMARY OF THE INVENTION

Accordingly, the present invention has been made to solve the above-mentioned problems occurring in the prior art, and an object of the present invention is to provide a current-differential relaying method and system for protecting a transformer more correctly by calculating and estimating an exciting current including a core-loss current and a magnetizing current, and, in particular, a current-differential relaying method and system which can protect the transformer correctly irrespective of the level of the remanent flux.

In order to accomplish this object, there is provided a current-differential relaying method for transformer protection, comprising the steps of: sampling a primary current, a secondary current, and a primary voltage for each phase; obtaining a primary induced voltage using said primary current and said primary voltage; obtaining a core-loss current using said primary induced voltage; before a core saturation of said transformer, obtaining a differential current considering the ratio of numbers of transformer primary and secondary windings, deriving a first compensated differential current which compensates for said core-loss current from said differential current, and detecting a core saturation instant when a value of said first compensated current exceeds a predetermined threshold; at the time of said core saturation instant of said transformer, obtaining a core flux of said core saturation instant by comparing said first compensated differential current with a magnetization curve; after said core saturation instant of said transformer, obtaining a core flux at a corresponding instant using said core flux of said core saturation instant as an initial value, deriving a magnetizing current of said corresponding instant by comparing said obtained core flux at said corresponding instant with said magnetization curve, and obtaining a second differential current which compensates for said magnetizing current and said core-loss current from said differential current considering the ratio of numbers of windings; and using said second differential current to determine whether or not an internal fault of said transformer occurs.

Furthermore, there is provided a compensated current differential relaying system for transformer protection comprising a controller performing the steps of: sampling a primary current, a secondary current, and a primary voltage for each phase; obtaining a primary induced voltage using said primary current and said primary voltage; obtaining a core-loss current using said primary induced voltage; before a core saturation of said transformer, obtaining a differential current considering the ratio of numbers of transformer primary and secondary windings, deriving a first compensated differential current which compensates for said core-loss current from said differential current, and detecting a core saturation instant when a value of said first compensated current exceeds a predetermined threshold; at the time of said core saturation instant of said transformer, obtaining a core flux of said core saturation instant by comparing said first compensated differential current with a magnetization curve; after said core saturation instant of said transformer, obtaining a core flux at a corresponding instant using said core flux of said core saturation instant as an initial value, deriving a magnetizing current of said corresponding instant by comparing said obtained core flux at said corresponding instant with said magnetization curve, and obtaining a second differential current which compensates for said magnetizing current and said core-loss current from said differential current considering the ratio of numbers of windings; and using said second differential current to determine whether or not an internal fault of said transformer occurs.

Furthermore, there is provided a compensated current differential relaying method for transformer protection comprising the steps of: sampling a primary current, a secondary current, and a primary voltage for each phase; obtaining a primary induced voltage using said primary current and said primary voltage; obtaining a core-loss current using said primary induced voltage; before a core saturation of said transformer, obtaining a differential current considering the ratio of numbers of transformer primary and secondary windings, and detecting a core saturation instant when a value of said differential current exceeds a predetermined threshold; at the time of said core saturation instant of said transformer, obtaining a core flux of said core saturation instant by assuming said differential current as a magnetizing current and comparing it with a magnetization curve; after said core saturation instant of said transformer, obtaining a core flux at a corresponding instant using said core flux of said core saturation instant as an initial value, deriving a magnetizing current of said corresponding instant by comparing said obtained core flux at said corresponding instant with said magnetization curve, and obtaining a compensated differential current which compensates for said magnetizing current from said differential current considering the ratio of numbers of windings; and using said second differential current to determine whether or not an internal fault of said transformer occurs.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

The present invention proposes a compensated-current differential relay for transformer protection. The invention uses the same restraining current as a conventional relay, but implements more accurate transformer protection based on the differential current modified to compensate for the exciting current.

The present invention generally comprises the steps of; calculating a core-loss current from a core-loss resistance and an induced voltage; inserting a compensated differential current at the start of core saturation into the magnetization curve to calculate the value of the core flux at the corresponding instant; and using said value of the core flux as the initial value of the core flux to derive the core flux at any instant after core saturation. And the present invention further comprises the step of inserting the derived core flux into the magnetization curve to estimate the magnetizing current corresponding to the core flux. And then the present invention further comprising the step of deriving the modified differential current by subtracting from the primary current the secondary current which is obtained by being multiplied by the magnetizing current, the core-loss current and the ratio of numbers of windings, on the basis of which the internal fault is estimated.

The modified differential current used herein is considering the exciting current, $i_e(t)$, as follows:

$$i_d(t) = i_1(t) - a i_2(t) - i_c(t) - i_m(t) \quad (4)$$

where, $i_e(t) = i_c(t) + i_m(t)$.

The procedure for estimating the core-loss current $i_c(t)$ and the magnetizing current $i_m(t)$ will be described below in detail.

Figure 1:
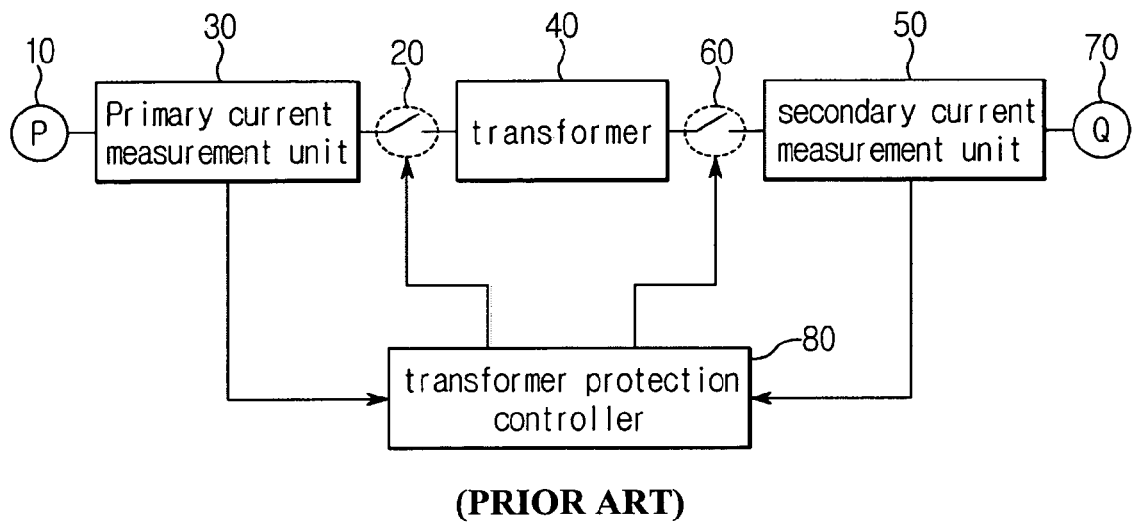
FIG. 1 represents a configuration of a relay system for transformer protection according to a conventional current differential method relay.
Figure 2:
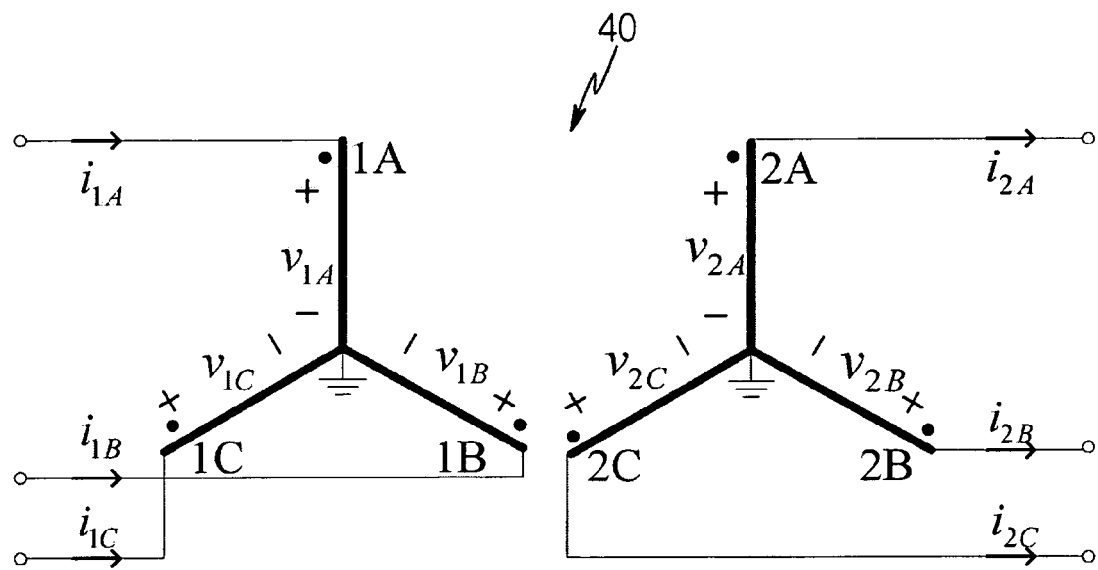
FIG. 2 shows a three-phase Y-Y transformer 40.
Figure 3:
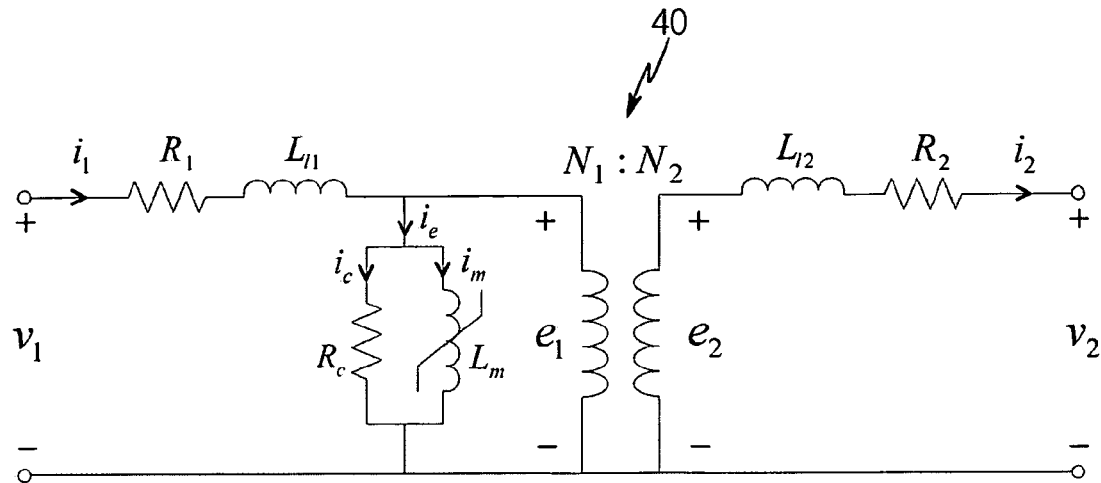
FIG. 3 shows a per phase equivalent circuit of the transformer 40.

In the equivalent circuit of FIG. 3, $i_c(t)$ is the current flowing through $R_c$. Since $R_c$ is given by the manufacturer, $i_c(t)$ can be calculated if $i_e(t)$ is known. Assuming that the transformer does not contain an internal fault, $v_1(t)$ at any instant is given by:

$$v_1(t) = R_1 i_1(t) + L_{i1} \frac{d i_1(t)}{dt} + e_1(t) \quad (5)$$

Rearranging the equation (5) gives:

$$e_1(t) = v_1(t) - R_1 i_1(t) - L_{i1} \frac{d i_1(t)}{dt} \quad (6)$$

Hence, $i_c(t)$ can be estimated as:

$$i_c(t) = \frac{e_1(t)}{R_c} \quad (7)$$

In equation (6), the value of the differential term should be obtained in order to obtain the induced voltage. Many known numerical analysis methods using the sampled digital data can be used to obtain the approximate value of the differential term of equation (6).

The procedure for estimating the magnetizing current $i_m(t)$ will be explained below.

The magnetization curve represents the relation of the core flux $\lambda(t)$ with $i_m(t)$; hence, $i_m(t)$ can be obtained if the core flux $\lambda(t)$ is calculated. The core flux $\lambda(t)$ can be evaluated using:

$$\lambda(t) = \int_0^T e_1(t) dt + \lambda(t_0) \quad (8)$$

where, $\lambda(t_0)$ is the core flux at time $t_0$. Since the induced voltage $e_1(t)$ has been obtained in equation (6), $\lambda(t)$ can be derived if $\lambda(t_0)$ is estimated.

According to the present embodiment, the magnetizing current is estimated as follows.

Before core saturation, the modified differential current $i_d(t)$ is obtaining using:

$$i_d(t) = i_1(t) - a i_2(t) - i_c(t) \quad (9)$$

Figure 4:
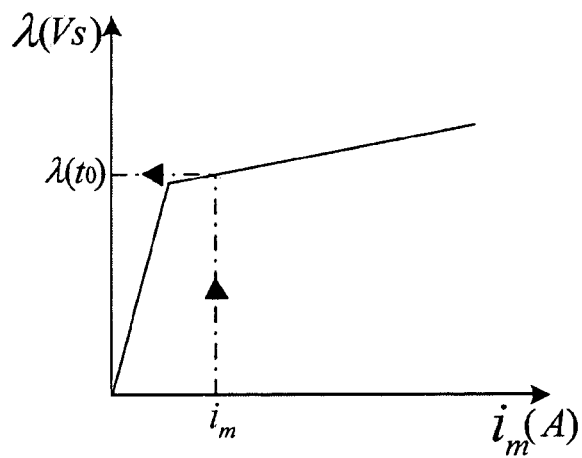
FIG. 4 shows the procedure of obtaining the initial value of core flux during core saturation.
Figure 5:
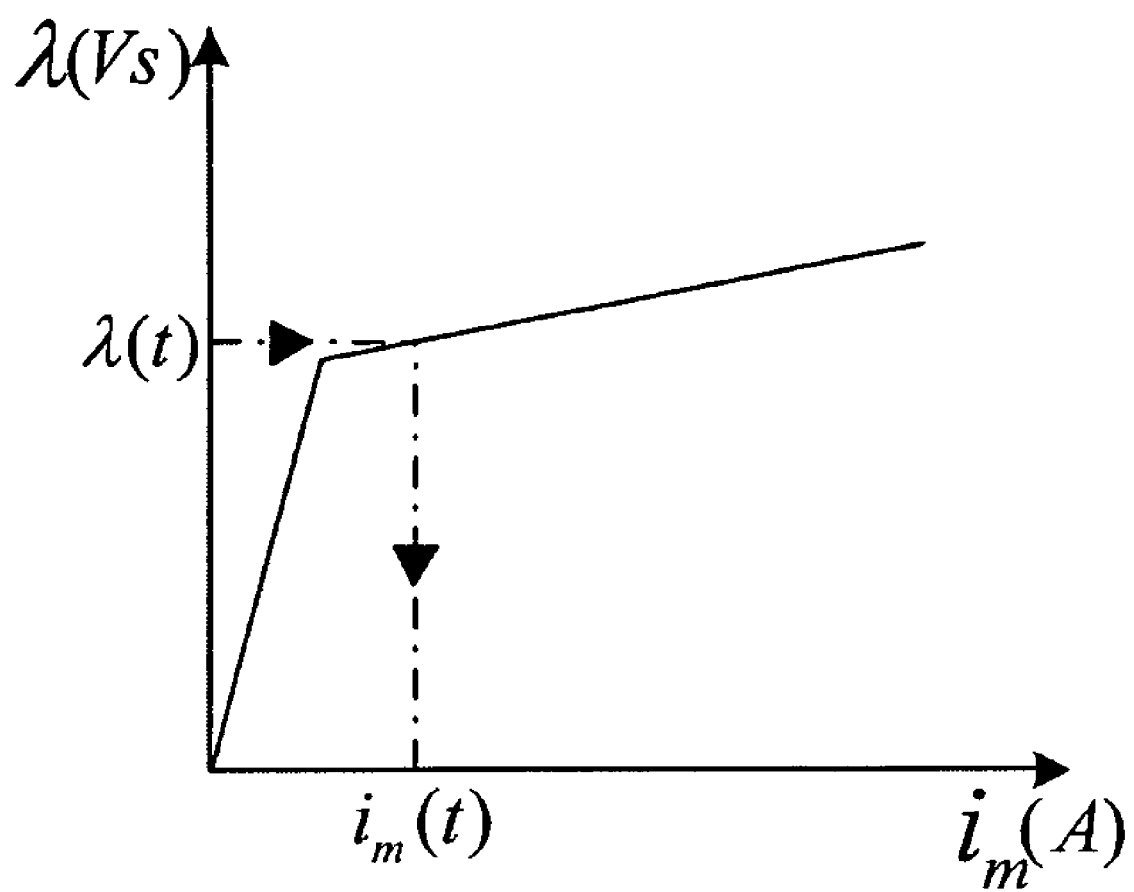
FIG. 5 shows the procedure of obtaining the values of core flux at any instant after core saturation.

Until the core enters saturation, $i_d(t)$ remains very small; if $i_d(t)$ exceeds a threshold, the start of saturation is detected. At this instant $i_d(t)$ is regarded as the magnetizing current; hence, the core flux can be obtained by inserting $i_d(t)$ into the magnetization curve (see FIG. 4). The flux value is considered to be $\lambda(t_0)$, which is regarded as the initial value after saturation, and is then used in calculating $\lambda(t)$ at the corresponding instant by equation (8). And the magnetizing current $i_m(t)$ corresponding to the core flux is estimated by inserting the calculated core flux $\lambda(t)$ into the corresponding interval of the magnetization curve(see FIG. 5). Then, $i_d(t)$ is estimated and the magnitude of its fundamental component is calculated from equation (4) by inserting the obtained magnetizing current and the core-loss current of equation (7). According to the present embodiment, $i_m(t)$ can be estimated accurately irrespective of the level of remanent flux during both magnetic inrush and over-excitation.

The threshold for the detection of the start of saturation is preferably selected larger than the current value at the saturation point; a value of twice the current at the saturation point can be used.

Figure 6:
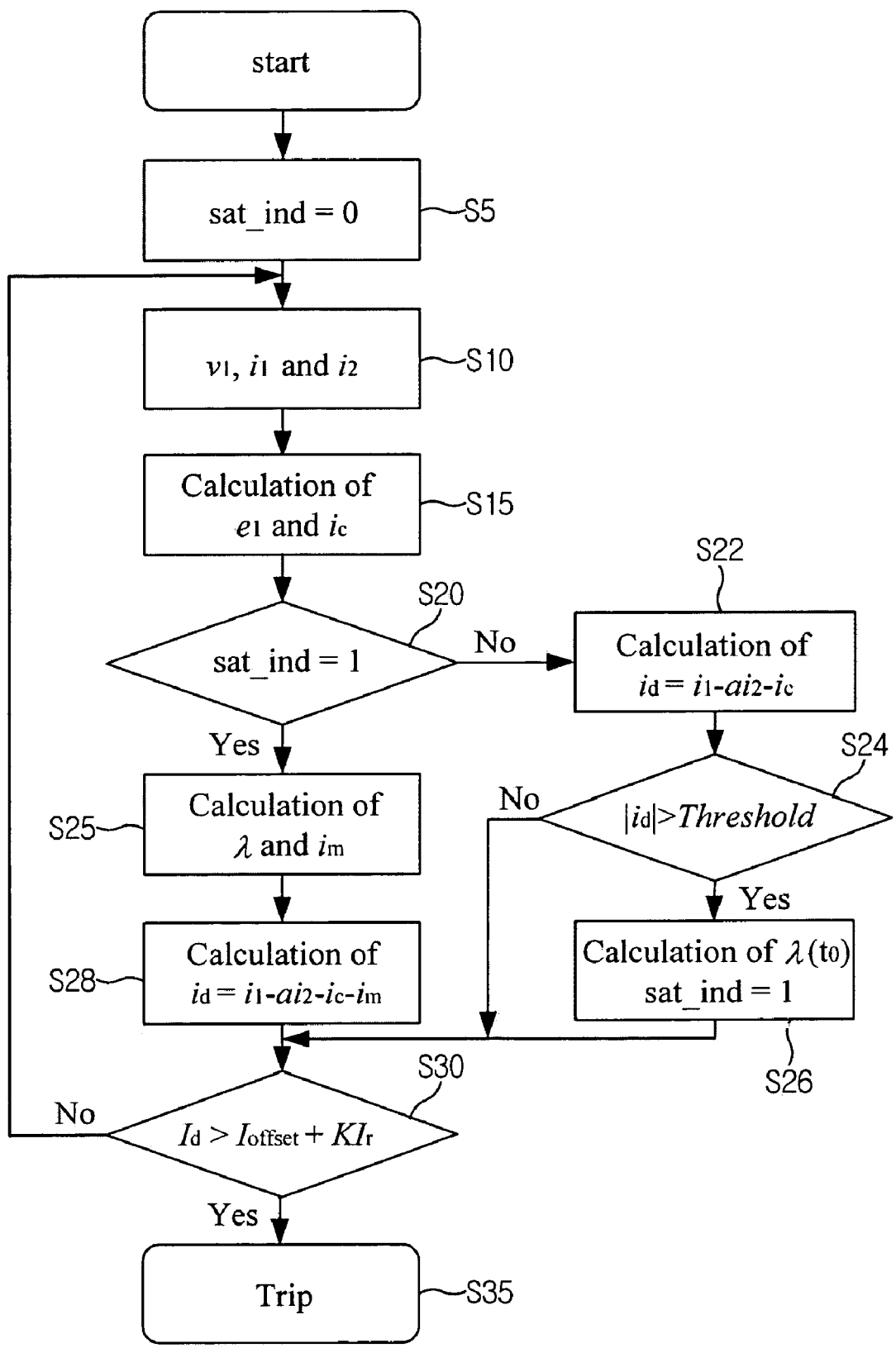
FIG. 6 shows a flow chart according to a preferred embodiment of the present invention.

FIG. 6 shows the flowchart to describe the procedure of the present embodiment.

Firstly, at step S5, a parameter sat_ind is initialized for detecting whether or not the core enters saturation.

Before the core enters saturation, the parameter has been set to zero. At step S10, the corresponding primary voltage $v_1$, primary current $i_1$, and secondary current $i_2(t)$ are sampled. At step S15, based on the obtained data, the induced voltage and the core-loss current are obtained using equations (4) and (5). And then, at step S22, by evaluating whether the parameter for evaluating whether or not the core enters saturation represents the state that the core has entered saturation (i.e. sat_ind=1), the differential current which compensates for the core-loss current is obtained using equation (9) if the parameter represents the state that the core has not yet entered saturation (i.e. sat_ind=0). When the core-loss is not compensated for, it may be possible to use the conventional equation for the differential current, $i_d(t)=i_1(t)-ai_2(t)$, instead of equation (9).

Before the core enters saturation, the value of $i_d(t)$ in equation (9) is very small because the magnetizing current is not large, but after the core enters saturation, its value becomes much larger. Therefore, according to the present invention, at step S24, it is determined whether the magnitude of the differential current exceeds a predetermined threshold. If the magnitude of the differential current does not exceed the predetermined threshold, the detection of a fault is performed based on the differential current in equation (9) at step S30, because the saturation has not yet occurred.

When the differential current exceeds the threshold at a specific instant during performing the algorithm (step S24), this instant is evaluated as the initiation point of saturation, the differential current at the specific instant is considered as the magnetizing current to obtain the core flux at the corresponding instant, and the parameter is adjusted to represent the state that the core has entered saturation (i.e. sat_ind=1) at step S26. At this point, the threshold may be just set to the value larger than the value of current at the saturation point.

From the instant after the parameter is adjusted (i.e. sat_ind=1), the procedure after core saturation is performed (step S20). Firstly, the corresponding primary voltage $v_1$, primary current $i_1$, and secondary current are sampled (step S10). At step S15, based on the obtained data, the induced voltage and the core-loss current are obtained using equations (4) and (5). Since the parameter represents the state that the core has entered saturation (i.e. sat_ind=1), considering the core flux at the start of saturation as the initial value, the core flux at the corresponding instant is obtained by the equation (8) and inserted into the magnetization curve to estimate the magnetizing current at the corresponding instant (step S25). At step 28, the value of differential current at the corresponding instant which compensates for the core-loss current and the magnetizing current is obtained by equation (4), and, at step S30, the fault evaluation is performed based on it. If it is evaluated as a fault at a specific time, a trip signal for transformer operation is generated (step S35).

To verify the effects of the proposed method of the present invention, the transformer was modeled using EMTP, the various data for magnetic inrush, internal fault, over-excitation and external fault were generated, and then the results were compared with those from conventional differential current relay.

Figure 7:
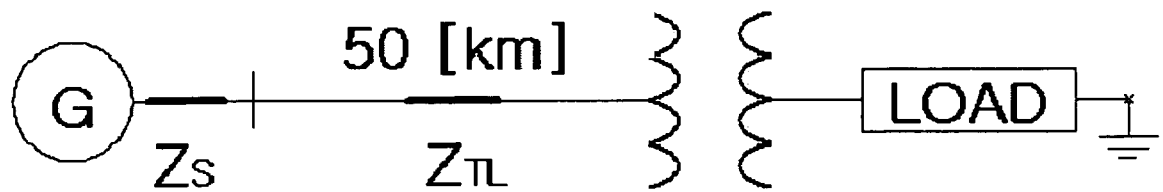
FIG. 7 shows a model used for verifying the effects of the present invention.

FIG. 7 shows a model of the power system for verification. In the figure, the three phase Y-Y transformer (154 kV/22 kV, 55 MVA) was modeled using EMPT at a sampling rate of 64 samples/cycle.

The hysteresis characteristic of the transformer core was modeled using a type-96 element, with a saturation point for using HYSDAT 40 A and 333,754 Vs. Butterworth $2^{nd}$ order filters with a stop-band cut-off frequency of 1920 Hz were used as anti-aliasing filters. The threshold for detecting the start of saturation was set at twice the current of the saturation point, i.e. 80 A.

The experimental results will be showed only for A phase. For each case of magnetic inrush, internal fault, over-excitation, external fault, etc., the effects of the method according to the present invention will be compared with those according to the conventional differential current relay.

Magnetic Inrush

Since the magnitude of the inrush current depends on the energization angle, the remanent flux, and the load current, three extreme cases will be discussed below.

Case 1: Energization Angle of 0 deg, 0% Remanent Flux, No Load

Figure 8:
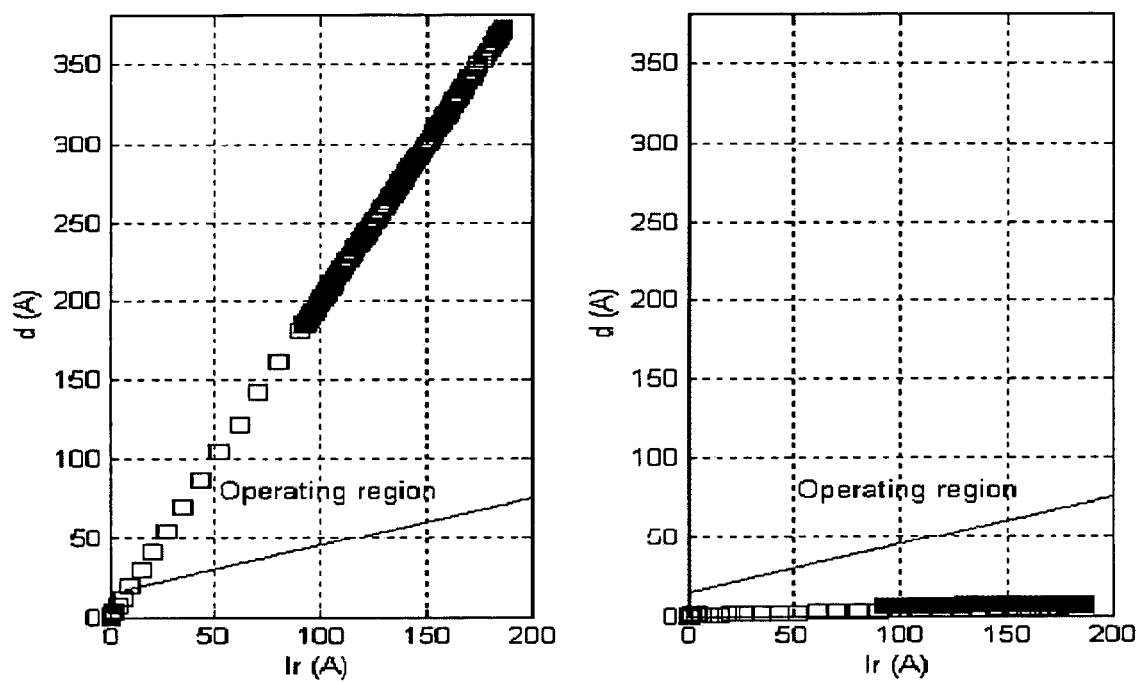
FIG. 8 shows the results from Case 1 according to the present invention (right), which is compared with those from the conventional method (left)

FIG. 8 shows the results for Case 1 according to the conventional differential current relay (left) and the present invention(right). The transformer is energized at 29.2 ms. In this case, the energization angle is zero and consequently the core was deeply saturated. The conventional differential current relay enters its operating region(see left in FIG. 8) and activates a trip signal at 5.2 ms after energization, but the present invention detects the start of saturation at 33.9 ms and calculates that the initial core flux was 345.4V. Equation (10) is used to calculate $\lambda(t)$, and $i_m(t)$ is obtained by inserting $\lambda(t)$ into the magnetization curve. Therefore, when $i_c(t)$ and $i_m(t)$ are subtracted from the measured differential current, the resulting compensated differential is reduced to a very small value and thus the relay does not enter the operating region and the trip signal remains inactive to correctly discriminate the magnetic inrush from the fault.

Case 2: Energization Angle of 0 deg, 80% Remanent Flux, No Load

Figure 9:
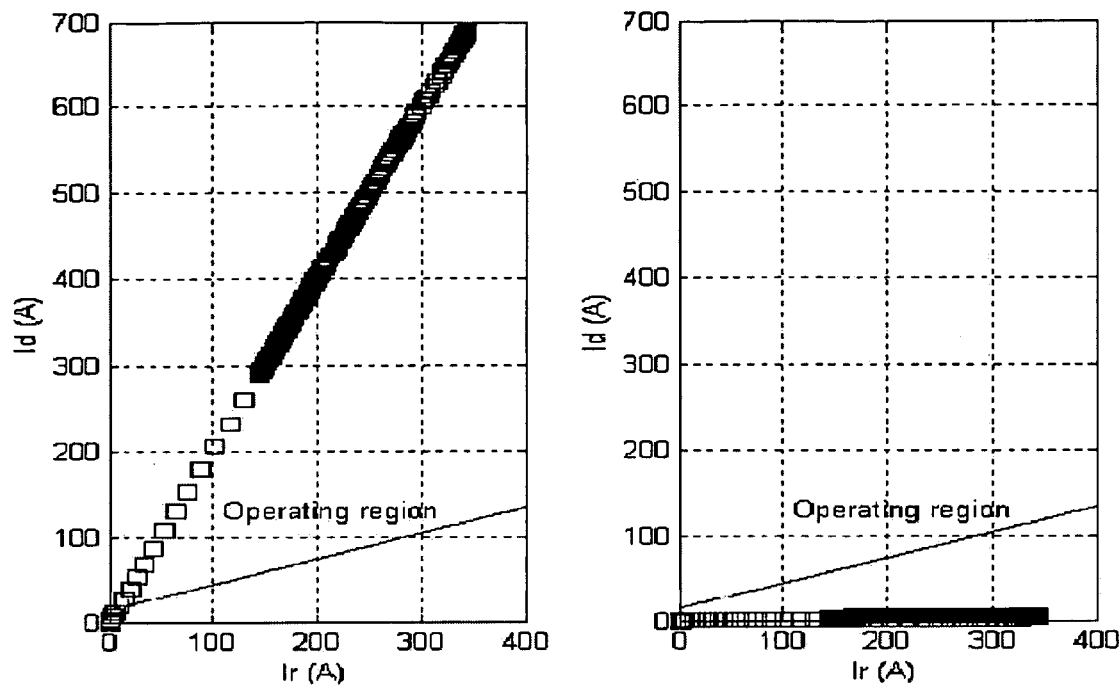
FIG. 9 shows the results from Case 2 according to the present invention (right), which is compared with those from the conventional method (left)

FIG. 9 shows the results for Case 2 according to the conventional differential current relay (left) and the present invention (right). Since the energization angle is zero and the remanent flux is 80%, the primary current is forced to a value greater than the above Case 1. For the conventional relay, the relay is forced to enter its operating region and the trip signal is activated at 3.1 ms after energization (see left in FIG. 9). However, the compensated relay according to the present invention detects the start of saturation at 31.5 ms and calculates an initial core flux of 339.3 Vs. The compensated relay then calculates the magnetizing current and the core-loss current and uses them to derive the compensated differential current. Since the value of the compensated differential current remains small, the relay does not enter the operating region (see right in FIG. 9), and the trip signal remains inactive.

Case 3: Energization Angle of 0 deg, 80% Remanent Flux, Full Load

Figure 10:
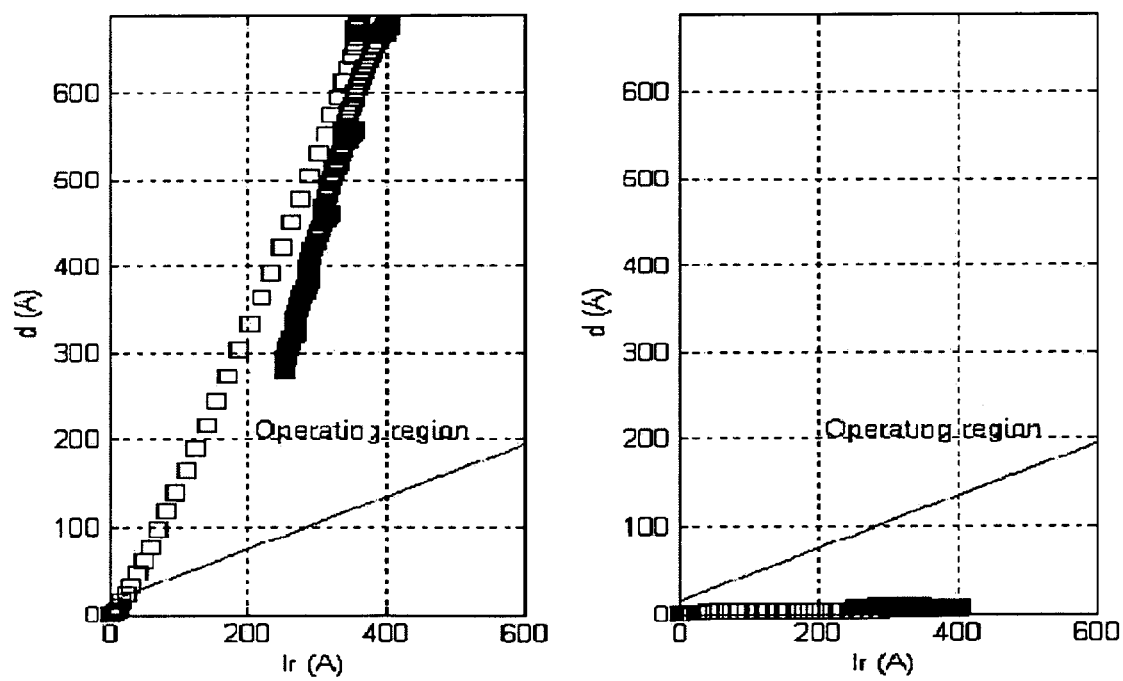
FIG. 10 shows the results from Case 3 according to the present invention (right), which is compared with those from the conventional method (left)

FIG. 10 shows the results for Case 3 according to the conventional differential current relay (left) and the present invention (right). Since a full load is connected to the transformer secondary, the primary current is forced to a value greater than the above Case 2. Therefore, the differential currents used in the conventional relay and the present invention are similar to those in the above Case 2, whilst the restraining currents are different. The conventional relay issues a trip signal at 3.4 ms after energization, but the present invention detects the start of saturation at 31.8 ms and calculates an initial core flux of 343.8 Vs. Since the value of the compensated current remains very small, the relay does not enter the operating region (see right in FIG. 10), and the trip signal remains inactive.

These three cases clearly indicate that the compensated relay according to the present invention can discriminate between the fault and the magnetic inrush, and operate correctly irrespective of the level of remanent flux.

Internal Winding Faults

Various type of internal faults were applied to phase-A of the primary winding and the compensated relay according to the present invention was tested and compared with the conventional relay.

Figure 11:
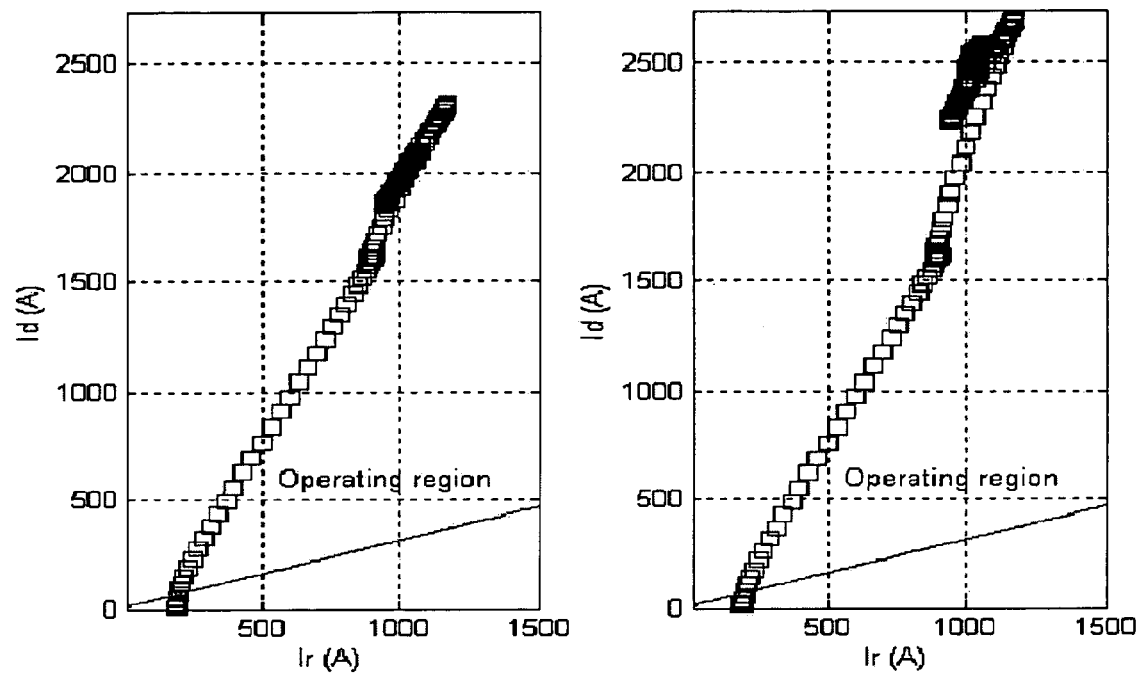
FIG. 11 shows the results from Case 4 according to the present invention (right), which is compared with those from the conventional method (left)

Case 4: A Turn-to-Ground Fault, Located 80% from the Neutral End and at 0 deg Inception Angle FIG. 11 shows the results for Case 4 according to the conventional differential current relay (left) and the present invention (right). The fault occurs at 29.2 ms on phase-A. The conventional relay entered the operating region at 2.8 ms after fault inception and a trip signal was issued (see left in FIG. 11).

On the other hand, the compensated relay according to the present invention detects the start of saturation at 30.5 ms and evaluates an initial core flux of 348.9 Vs. However, soon after the start of saturation, $i_m(t)$ decreases to a low value but increases again at 42 ms. This large $i_m(t)$ is irrelevant because the core is unlikely to saturate on an internal fault. This is because on an internal fault, $v_1(t)$ is significantly reduced while $i_1(t)$ is significantly increased; hence, the third term at the right hand side of equation (1) is dominant compared with the first and second terms, i.e.:

$$e_1(t) = v_1(t) - R_1 i_1(t) - L_{i1}\frac{di_1(t)}{dt} \approx -L_{i1}\frac{di_1(t)}{dt} = \frac{d\lambda(t)}{dt} \quad (12)$$

Therefore, the direction of $\lambda(t)$ is opposite to the direction of $i_1(t)$, which is in phase with the conventional $i_d(t)$; consequently, the direction of $i_m(t)$ is opposite to the direction of $i_d(t)$. And therefore, the compensated $i_d(t)$ is not reduced by subtraction of $i_m(t)$. According to the present invention, the compensated relay issues a trip signal at 2.8 ms after fault inception, which is the same as achieved with the conventional relay.

Over-Excitation

Figure 12:
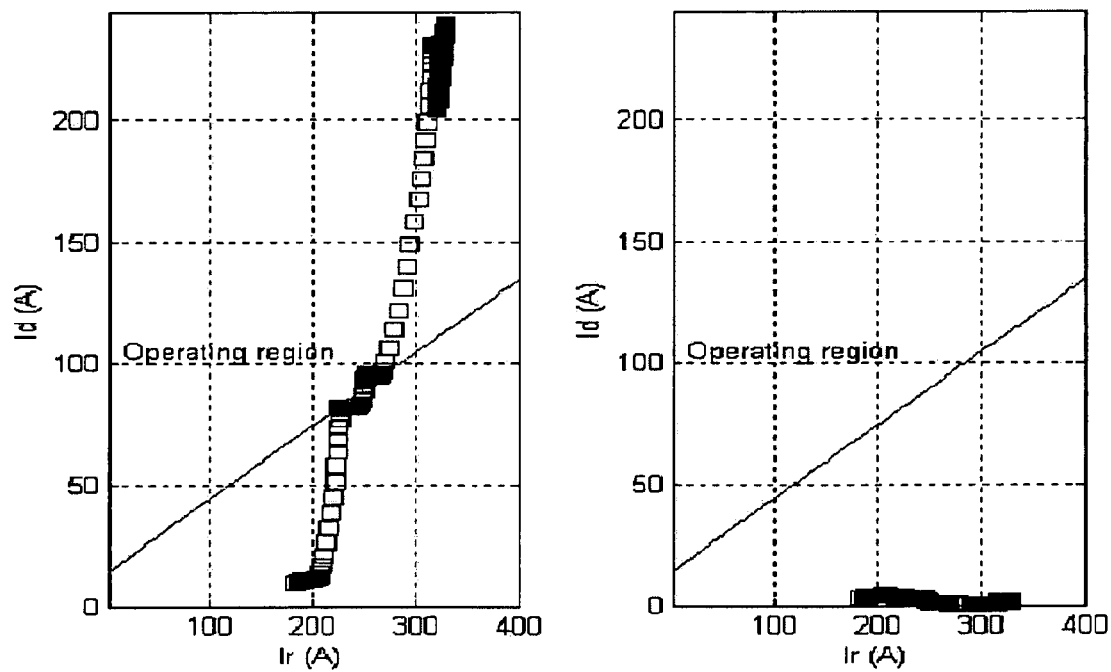
FIG. 12 shows the results from Case 5 according to the present invention (right), which is compared with those from the conventional method (left)

Case 5: Application of Voltage One and a Half as Large as the Primary Rating Voltage, Full Load FIG. 12 shows the results for Case 5 according to the conventional differential current relay and the present invention. Since an overvoltage is applied at 29.2 ms, the primary and second currents become distorted significantly and the differential current increased gradually. Therefore, the conventional relay entered the operating region at 46.6 ms and a trip signal was issued. On the other hand, since the value of the compensated current remains very small, the relay does not enter the operating region, and the trip signal remains inactive.

External Fault

Case 6: A Turn-to-Ground Fault, 0 deg and Phase-A Transformer Secondary Load

Figure 13:
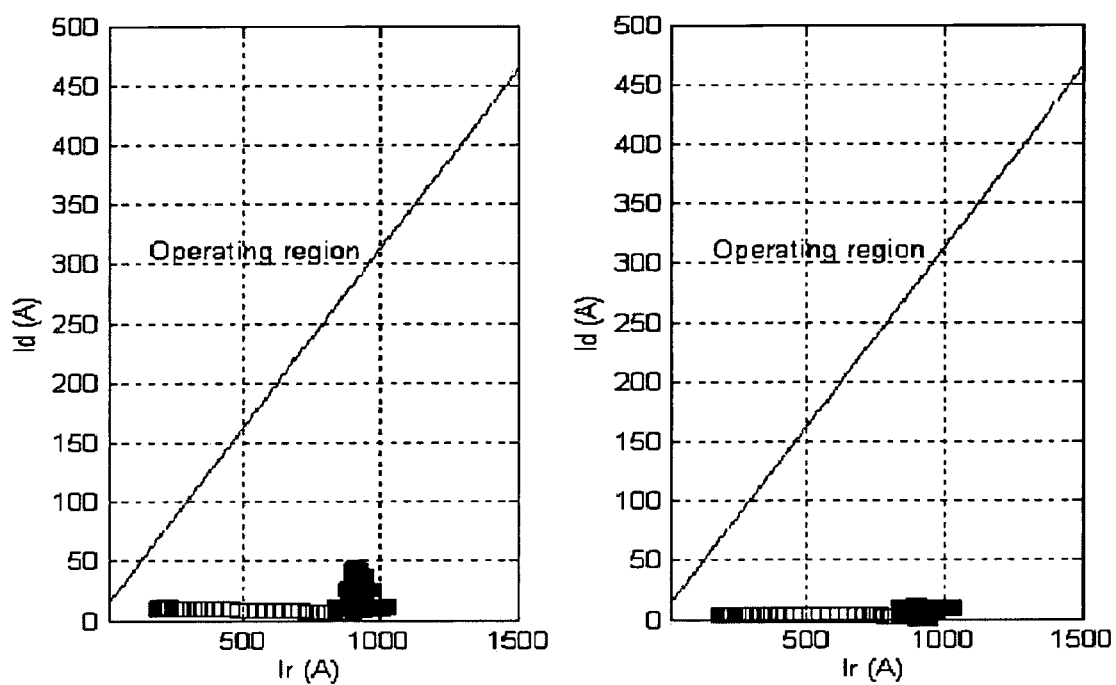
FIG. 13 shows the results from Case 6 according to the present invention (right), which is compared with those from the conventional method (left).

FIG. 13 shows the results for Case 6 according to the conventional differential current relay and the present invention. The fault occurred at 29.2 ms. After fault, the differential current $i_d(t)$ occurred significantly due to the saturation of transformer core. However, since only the fundamental component of 60 Hz was calculated, the conventional relay did not enter the operating region (see left in FIG. 13). On the other hand, since the value of the compensated current remains very small, the relay according to the present invention does not enter the operating region, and the trip signal remains inactive (see right in FIG. 13).

As described above in detail, according to the present invention, the relay can not only operate correctly irrespectively of the level of remanent flux, but also overcome the shortcomings of the prior art such as the delay of the operating time because it does not require the inclusion of restraining or blocking signals.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A compensated current differential relaying method for transformer protection comprising the steps of:
    sampling a primary current, a secondary current, and a primary voltage for each phase;
    obtaining a primary induced voltage using said primary current and said primary voltage;
    obtaining a core-loss current using said primary induced voltage;
    before a core saturation of said transformer, obtaining a differential current considering the ratio of numbers of transformer primary and secondary windings, deriving a first compensated differential current which compensates for said core-loss current from said differential current, and detecting a core saturation instant when a value of said first compensated current exceeds a predetermined threshold;
    at the time of said core saturation instant of said transformer, obtaining a core flux of said core saturation instant by comparing said first compensated differential current with a magnetization curve;
    after said core saturation instant of said transformer, obtaining a core flux at a corresponding instant using said core flux of said core saturation instant as an initial value, deriving a magnetizing current of said corresponding instant by comparing said obtained core flux at said corresponding instant with said magnetization curve, and obtaining a second differential current which compensates for said magnetizing current and said core-loss current from said differential current considering the ratio of numbers of windings; and
    detecting an internal fault of said transformer when the value of said second differential current exceeds a predetermined value.

2. The compensated current differential relaying method for transformer protection as claimed in claim 1, wherein said threshold is selected in a range larger than a saturation current point of said magnetization curve.

3. The compensated current differential relaying method for transformer protection as claimed in claim 1, wherein said differential current $i_d(t)$ is:

$$I_d = |\vec{I}_1 - a\vec{I}_2|$$

where, $\vec{I}_1$ and $\vec{I}_2$ are the phasors of the fundamental components of the primary and secondary currents, respectively, and $a = N_2/N_1$.

4. The compensated current differential relaying method for transformer protection as claimed in claim 3, wherein said first compensated differential current is:

$$i_d(t) = i_1(t) - ai_2(t) - i_c(t) - i_m(t)$$

where, $i_c(t)$ is the core-loss current.

5. The compensated current differential relaying method for transformer protection as claimed in claim 4, wherein said second compensated differential current is:

$$i_d(t) = i_1(t) - ai_2(t) - i_c(t) - i_m(t)$$

where, $i_m(t)$ is the magnetizing current.

6. The compensated current differential relaying method for transformer protection as claimed in claim 1, wherein said core-loss current is obtained using:

$$i_c(t) = \frac{e_1(t)}{R_c}$$

where, $R_c$ is a core-loss resistance, and $e_1(t)$ is an induced voltage and obtained using:

$$e_1(t) = v_1(t) - R_1 i_1(t) - L_{i1}\frac{di_1(t)}{dt}.$$

7. A compensated current differential relaying system for transformer protection comprising a controller performing the steps of:

sampling a primary current, a secondary current, and a primary voltage for each phase;

obtaining a primary induced voltage using said primary current and said primary voltage;

obtaining a core-loss current using said primary induced voltage;

before a core saturation of said transformer, obtaining a differential current considering the ratio of numbers of transformer primary and secondary windings, deriving a first compensated differential current which compensates for said core-loss current from said differential current, and detecting a core saturation instant when a value of said first compensated current exceeds a predetermined threshold;

at the time of said core saturation instant of said transformer, obtaining a core flux of said core saturation instant by comparing said first compensated differential current with a magnetization curve;

after said core saturation instant of said transformer, obtaining a core flux at a corresponding instant using said core flux of said core saturation instant as an initial value, deriving a magnetizing current of said corresponding instant by comparing said obtained core flux at said corresponding instant with said magnetization curve, and obtaining a second differential current which compensates for said magnetizing current and said core-loss current from said differential current considering the ratio of numbers of windings; and using detecting an internal fault of said transformer when the value of said second differential current exceeds a predetermined value.

8. A compensated current differential relaying method for transformer protection comprising the steps of:

sampling a primary current, a secondary current, and a primary voltage for each phase;

obtaining a primary induced voltage using said primary current and said primary voltage;

obtaining a core-loss current using said primary induced voltage;

before a core saturation of said transformer, obtaining a differential current considering the ratio of numbers of transformer primary and secondary windings, and detecting a core saturation instant when a value of said differential current exceeds a predetermined threshold;

at the time of said core saturation instant of said transformer, obtaining a core flux of said core saturation instant by assuming said differential current as a magnetizing current and comparing it with a magnetization curve;

after said core saturation instant of said transformer, obtaining a core flux at a corresponding instant using said core flux of said core saturation instant as an initial value, deriving a magnetizing current of said corresponding instant by comparing said obtained core flux at said corresponding instant with said magnetization curve, and obtaining a compensated differential current which compensates for said magnetizing current from said differential current considering the ratio of numbers of windings; and using detecting an internal fault of said transformer when the value of said second differential current exceeds a predetermined value.

* * * * *

UNITED STATES PATENT AND TRADEMARK OFFICE
CERTIFICATE OF CORRECTION

PATENT NO. : 7,340,355 B2
APPLICATION NO. : 11/476891
DATED : March 4, 2008
INVENTOR(S) : Kang et al.

It is certified that error appears in the above-identified patent and that said Letters Patent is hereby corrected as shown below:

Column 3, line 5, equation (1) should read as follows:

$$I_d = \left| \vec{I}_1 - a\vec{I}_2 \right| \qquad \text{------------------ (1)}$$

Column 3, line 8, "$I^P_1$ and $I^P_2$" should read -- $\vec{I}_1$ and $\vec{I}_2$ --

Column 3, line 15, equation (2) should read as follows:

$$I_r = \frac{\left| \vec{I}_1 + a\vec{I}_2 \right|}{2} \qquad \text{------------------ (2)}$$

Column 3, line 31, the equation should read:

$$I_d = \left| \vec{I}_1 - a\vec{I}_2 \right|$$

UNITED STATES PATENT AND TRADEMARK OFFICE
CERTIFICATE OF CORRECTION

PATENT NO. : 7,340,355 B2
APPLICATION NO. : 11/476891
DATED : March 4, 2008
INVENTOR(S) : Kang et al.

It is certified that error appears in the above-identified patent and that said Letters Patent is hereby corrected as shown below:

Column 11, line 8, Claim 3, the following text

" $I_d = |\vec{I}_1 - a\vec{I}_2$ 51 ", should read:

-- $I_d = |\vec{I}_1 - a\vec{I}_2|$ --

Signed and Sealed this

Fifteenth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,340,355 B2
APPLICATION NO. : 11/476891
DATED : March 4, 2008
INVENTOR(S) : Kang et al.

Page 1 of 1

It is certified that error appears in the above-identified patent and that said Letters Patent is hereby corrected as shown below:

Column 3, line 5, equation (1) should read as follows:

$$I_t = \left| \vec{I}_1 - a\vec{I}_2 \right| \quad \text{------------------} \quad (1)$$

Column 3, line 8, $I^p{}_1$ and $I^p{}_2$ should read $\vec{I}_1$ and $\vec{I}_2$ Column 3, line 15, equation (2) should read as follows:

$$I_r = \frac{\left| \vec{I}_1 + a\vec{I}_2 \right|}{2} \quad \text{------------------} \quad (2)$$

Column 3, line 31, the equation should read:

$$I_t = \left| \vec{I}_1 - a\vec{I}_2 \right|$$

Column 11, line 8, Claim 3, the following text $$I_d = \left| \vec{I}_1 - a\vec{I}_2 \right| \; 51$$

should read:

$$I_d = \left| \vec{I}_1 - a\vec{I}_2 \right|$$

Signed and Sealed this

Twenty-ninth Day of December, 2009

David J. Kappos
*Director of the United States Patent and Trademark Office*